(12) United States Patent
Johansson et al.

(10) Patent No.: US 8,923,370 B2
(45) Date of Patent: Dec. 30, 2014

(54) RADIO COMMUNICATION APPARATUS METHOD

(71) Applicant: Telefonaktiebolaget L M Ericsson (publ), Stockholm (SE)

(72) Inventors: Bernt Johansson, Värmdö (SE); Bo Berglund, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 43 days.

(21) Appl. No.: 13/698,525

(22) PCT Filed: Oct. 23, 2012

(86) PCT No.: PCT/SE2012/051134
§ 371 (c)(1),
(2), (4) Date: Nov. 16, 2012

(87) PCT Pub. No.: WO2013/165293
PCT Pub. Date: Nov. 7, 2013

(65) Prior Publication Data
US 2014/0064341 A1    Mar. 6, 2014

Related U.S. Application Data

(60) Provisional application No. 61/642,047, filed on May 3, 2012.

(30) Foreign Application Priority Data

May 3, 2012  (WO) ................. PCT/SE2012/050464
May 3, 2012  (WO) ................. PCT/SE2012/050465

(51) Int. Cl.
*H04B 1/38* (2006.01)
*H04L 5/16* (2006.01)
*H04B 1/40* (2006.01)
*H04B 1/00* (2006.01)
*H04B 1/26* (2006.01)

(52) U.S. Cl.
CPC ................. *H04B 1/40* (2013.01); *H04B 1/0067* (2013.01); *H04B 1/26* (2013.01); *H04B 1/0007* (2013.01)
USPC ........... 375/222; 375/219; 375/220; 375/221; 375/223; 375/296; 455/73; 455/550.1; 455/552.1; 455/553.1; 455/557

(58) Field of Classification Search
CPC ............ H04B 1/40; H04B 3/23; H04B 1/403; H04B 1/406; H04B 1/006; H04B 1/005; H04B 1/0057; H04L 27/2601; H04L 1/0025; H04L 25/0266; H04L 7/033; H04L 25/06; H04L 5/023; H04L 1/243; H04L 1/0001; H04L 1/0009; H04L 1/1854; H04L 25/4927; H04L 27/2608; H04L 27/10; H04L 27/2273; H04L 27/2071; H04L 1/0003; H04L 1/0071; H04L 5/0007; H04L 27/0008; H04L 27/368; H04L 25/03343; H04L 27/2647; H04L 1/20; H04L 5/1438; H04M 11/06; H04M 11/062; H04M 1/72519; H04M 1/72522; H04M 1/0214; H04M 2250/12; H04M 1/72527; H04M 1/7253; H04M 1/725; H03F 1/3247; H03F 1/3294; H03F 2201/3233; H03F 3/24; H03F 1/3241; H04N 5/4401; H04W 88/02; H04W 88/06; H04W 48/18
USPC ............ 375/219–223, 295–297, 316; 455/73; 455/550.1, 552.1, 553.1, 557
See application file for complete search history.

(56) References Cited

U.S. PATENT DOCUMENTS

| | | | |
|---|---|---|---|
| 6,463,093 B1 | 10/2002 | Komara et al. | |
| 6,970,709 B1 * | 11/2005 | Williams | .................. 455/452.1 |
| 2006/0030277 A1 | 2/2006 | Cyr et al. | |
| 2008/0101503 A1 | 5/2008 | Gupta | |

FOREIGN PATENT DOCUMENTS

EP    2 528 293 A1    11/2012

OTHER PUBLICATIONS

Notification of International Search Report and Written Opinion mailed Oct. 16, 2013 and International Search Report mailed Oct. 16, 2013 in PCT/SE2012/051134.
Written Opinion of the International Searching Authority mailed Oct. 16, 2013 in PCT/SE2012/051134.

* cited by examiner

*Primary Examiner* — Phuong Phu
(74) *Attorney, Agent, or Firm* — Nixon & Vanderhye P.C.

(57) ABSTRACT

A digital radio module comprises a modular architecture for use in a multi-band multi-standard radio communication apparatus. The digital radio module comprises one or more digital transmitter sub modules, each digital transmitter sub module comprising a plurality of digital transmitter chains, and one or more digital receiver sub modules, each digital receiver sub module comprising a plurality of digital receiver chains. Each of the digital transmitter sub modules and digital receiver sub modules comprises a respective control unit for individually configuring each digital transmitter sub module and digital receiver sub module such that the digital radio module is operable to transmit and/or receive multiple different carrier frequency signals in one or more different modes of operation.

12 Claims, 10 Drawing Sheets

RADIO COMMUNICATION APPARATUS METHOD

This application is the U.S. National Phase of International Application No. PCT/SE2012/051134, filed 23 Oct. 2012, which designated the U.S. and claims priority to SE Application No. PCT/SE2012/050464, filed 3 May 2012, and SE Application No. PCT/SE2012/050465, filed 3 May 2012, and claims the benefit from U.S. Provisional Application No. 61/642,047, filed 3 May 2012, the entire contents of each of which are hereby incorporated by reference.

TECHNICAL FIELD

The present invention relates to a radio communication apparatus and method, and in particular to a digital radio module comprising a modular architecture, and a method performed in such a digital radio module.

BACKGROUND

For many years the deployment of telecommunication systems, for different standards and many frequency bands (for instance 200-300 MHz and 400-500 MHz), has been realized to a large extent by placing radio base stations (RBS) in cellular networks covering large areas. An important link in a traditional radio base station architecture is between the active parts of the system (that is the digital and analog components of the system) to the passive parts (such as the filters and antennas). This high-power analog radio-frequency (RF) link is critical in the sense that it sometimes requires long cables of high quality and large dimensions, in order keep the unavoidable signal quality losses and power losses to a minimum. Such links suffer from the disadvantage of having high costs.

There has been a recent change to integrate the power amplifier and other RF blocks more closely with the physical antenna in order to avoid this critical link, or to reduce the length of the link, which has resulted in what is termed an integrated antenna unit (IAU). The introduction of an IAU implies a change from RF feeders into a high-speed digital interface between a digital processing unit (DPU) and the IAU.

In order to implement a base station today with two or more frequency bands, several complete transmitters are combined on the analogue side after a transmission filter.

Thus, when implementing transmitters for multiple frequency bands, two or more transmitters are implemented in the analogue domain, one transmitter for each frequency band. Similarly, when implementing receivers for multiple frequency bands, two or more receivers are implemented in the analogue domain, one receiver for each frequency band.

This type of technology has a disadvantage in that the multi band transmitters/receivers become bulky, and have low energy efficiency and increased manufacturing cost due to the fact that several complete RF transmitters/receivers in the analogue domain are used to implement the multi band transmitters/receivers.

Furthermore, a radio communication apparatus comprising radio transmitters and radio receivers, as currently known and used in telecommunications networks, comprise transmitter and receiver chains which are set up to work well with a specific range (or "band") of frequencies only. For instance, a radio unit which works well in the 200-400 MHz range will not work well in the 500-700 MHz range. By the same token, the currently known radio communication apparatus are standard specific which means that one which is used for a GSM compliant telecommunications network cannot be used for an LTE network.

It is possible to add additional transmitter and/or receiver chains of the analogue type described above to enable the radio units to operate at other frequency ranges and/or standards but this has several disadvantages as it makes them bigger, increases their energy consumption considerably and leads to more complex (for instance multi layer) printed circuit boards due to the increased number of analogue and digital components that need to be integrated.

The state of the art analogue RF up-converters used in today's radio units have limited instantaneous bandwidths and are thus not well suited for wideband multi-band operation. Instantaneous bandwidth, IBW, is the bandwidth over which the complete transmitter can process carriers.

Radio units are today implemented by integrating analogue and digital components onto one or more printed boards. The boards tend to be very complex and thus multi layer boards are required. These boards are made out of a very expensive material or a mix of materials, which is even more expensive. Board complexity is primarily caused by the large number of high speed interconnections between components on one and the same board, and also by the number of interconnects/interconnections between different boards. Boards based on traditional technologies are therefore quite complicated, and dissipate a lot of energy, a significant part of which is consumed in the interconnections between the components and boards.

SUMMARY

It is an aim of the present invention to provide an apparatus and method which obviate or reduce at least one or more of the disadvantages mentioned above.

According to a first aspect of the invention, there is provided a digital radio module comprising a modular architecture for use in a multi-band multi-standard radio communication apparatus that is operable over a wide frequency range. The digital radio module comprises one or more digital transmitter sub modules, each digital transmitter sub module comprising a plurality of digital transmitter chains. The digital radio module also comprises one or more digital receiver sub modules, each digital receiver sub module comprising a plurality of digital receiver chains. Each of the digital transmitter sub modules and digital receiver sub modules comprises a respective control unit for individually configuring each digital transmitter sub module and digital receiver sub module such that the digital radio module is operable to transmit and/or receive multiple different carrier frequency signals in one or more different modes of operation.

This modular approach to having digital transmitter sub modules and digital receiver sub modules, each being individually configurable, has the advantage that the digital radio module as a whole can be configured to be used with any set of carrier frequencies, and with multiple standards, during different modes of operation.

According to another aspect of the invention, there is provided a method in a digital radio module that comprises a modular architecture for use in a multi-band multi-standard radio communication apparatus that is operable over a wide frequency range. The method comprises the steps of: providing one or more digital transmitter sub modules, each digital transmitter sub module comprising a plurality of digital transmitter chains; and providing one or more digital receiver sub modules, each digital receiver sub module comprising a plurality of digital receiver chains. The method further comprises the step of individually configuring each digital transmitter sub module and digital receiver sub module such that the digital radio module is operable to transmit and/or receive multiple different carrier frequency signals in one or more different modes of operation.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

It is noted that, in the discussions of the various embodiments below, the term Multi-Standard Radio (MSR) is defined as a radio communication apparatus capable of processing any type of radio access technology in mixed mode operation.

Figure 1A:
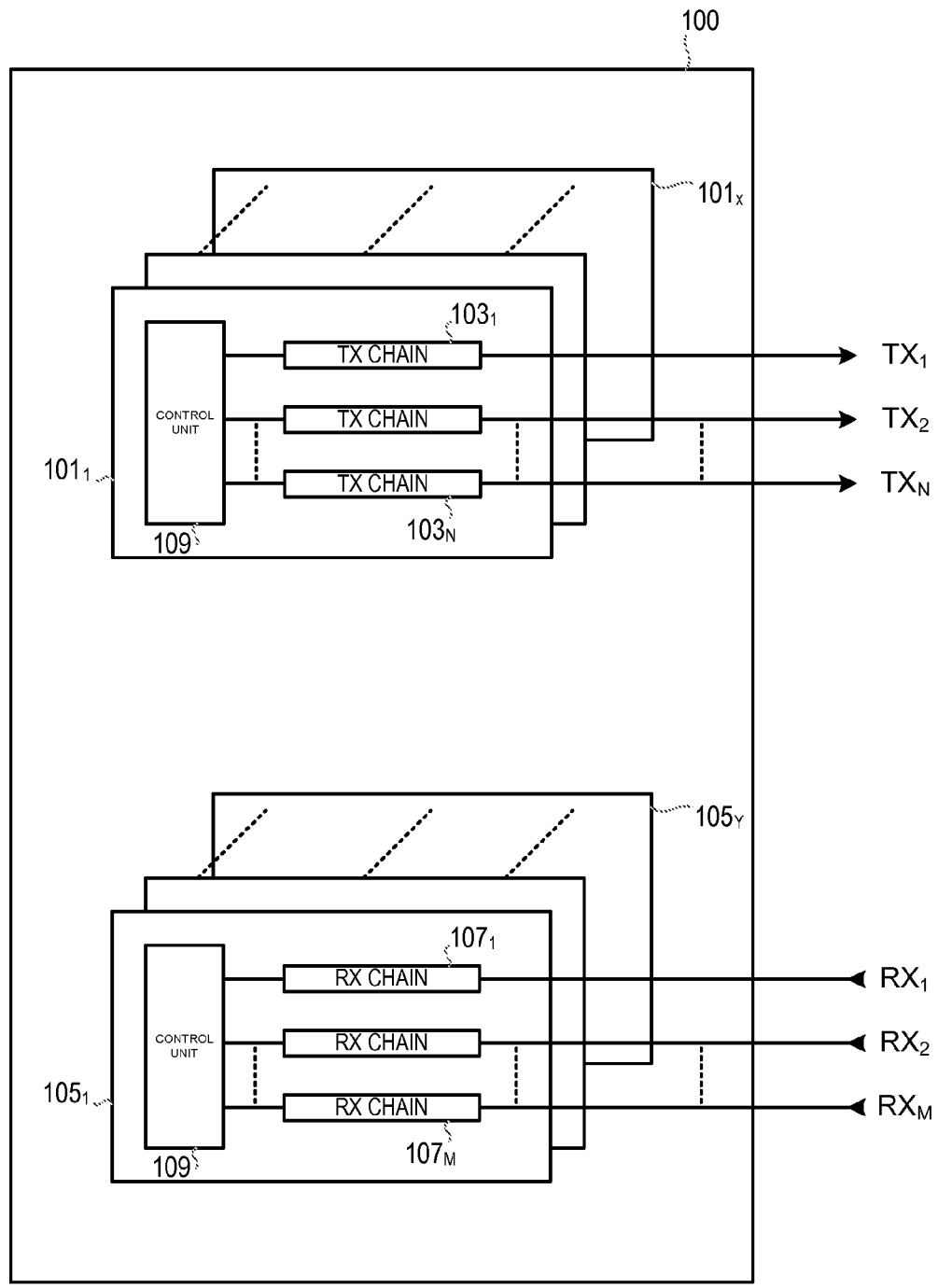
FIG. 1a shows a digital radio module comprising a modular architecture according to an embodiment of the invention.

FIG. 1 shows a digital radio module 100 according to an embodiment of the invention. The digital radio module 100 comprises a modular architecture for use in a multi-band multi-standard radio communication apparatus. The digital radio module 100 comprises one or more digital transmitter sub modules $101_1$ to $101_X$, each digital transmitter sub module comprising a plurality of digital transmitter chains $103_1$ to $103_N$. The digital radio module 100 also comprises one or more digital receiver sub modules $105_1$ to $105_Y$, each digital receiver sub module comprising a plurality of digital receiver chains $107_1$ to $107_M$. Each of the digital transmitter sub modules $101_1$ to $101_X$ and digital receiver sub modules $105_1$ to $105_Y$ comprises a respective control unit 109 for individually configuring each digital transmitter sub module and digital receiver sub module such that the digital radio module 100 is operable to transmit and/or receive multiple different carrier frequency signals in one or more different modes of operation.

By providing a modular architecture having transmitter and receiver sub modules, each being configurable in its own right, this has the advantage of providing a highly integrated multi-band multi-standard radio (MSR) Digital Radio Module (DRM), which can support at least one pair of TX/RX antennas. The modular architecture enables a highly frequency agnostic digital radio module to be provided ("agnostic" meaning in this context that the performance of the module does not depend on the frequencies on which it operates).

As will be described in greater detail below, the embodiments of the invention, based on the modular architecture described above, can support:

Multi band and multi-standard RF transmitters with capabilities for base band processing, for example Crest Factor Reduction (CFR) or Digital Pre-Distortion (DPD), by means of digital transmitters such as Direct Radio Frequency (DRF) transmitters in the digital domain.

Multi band and multi-standard multi-carrier receivers with digital processing capabilities for performing operations such as channelizing, filtering and base band processing.

Calibration capabilities of both transmitters and receivers by means of DRF technology.

The digital radio module, (DRM), described above, and in greater detail in the embodiments below, obviates the complex board layout normally found in boards for radio units that have complex interconnections between components. The modular architecture enables the interconnections between the components to be kept short, such that power consumption generated in the interconnections between the components inside the digital radio module can be reduced. Long lines and connectors have large parasitic capacitance and thus power consumption is increased by the need to drive these parasitic capacitors. Therefore, by keeping the transmission lines short according to the modular architecture of the embodiments of the invention, low power drivers can be used in order to lower the power dissipation in the device. Another benefit is an improved frequency response for the radio communication apparatus which is achieved by the lower capacitances and inductances in the interconnections between the sub modules of the modular architecture.

As the digital radio module is multi-band (or effectively frequency agnostic) and multi-standard it can be used in any base station radio unit. The embodiments of the invention can also be used in other radio communication enabled apparatus. It is noted that more than one DRM can be used in radio implementations such as an array antenna with active antenna elements, in order to achieve wanted functionality and performance.

It can be seen that the architecture is defined by means of sub modules that may be packed into a digital radio module. Two types of sub modules are provided, namely the digital transmitter and digital receiver modules. According to some embodiments, each sub module also includes transmitter and/or receiver characterization capabilities.

It is noted that a digital transmitter sub module and a digital receiver sub module may be combined into a transmitter/receiver sub module, with a common control unit 109 for controlling the combined transmitter/receiver sub module. Furthermore, instead of having a plurality of separate control units within each of the respective digital transmitter sub modules or digital receiver sub modules, one or more of the control units may be combined into a central control unit that is configured to control one or more of the digital transmitter sub modules or digital receiver sub modules.

Figure 1B:
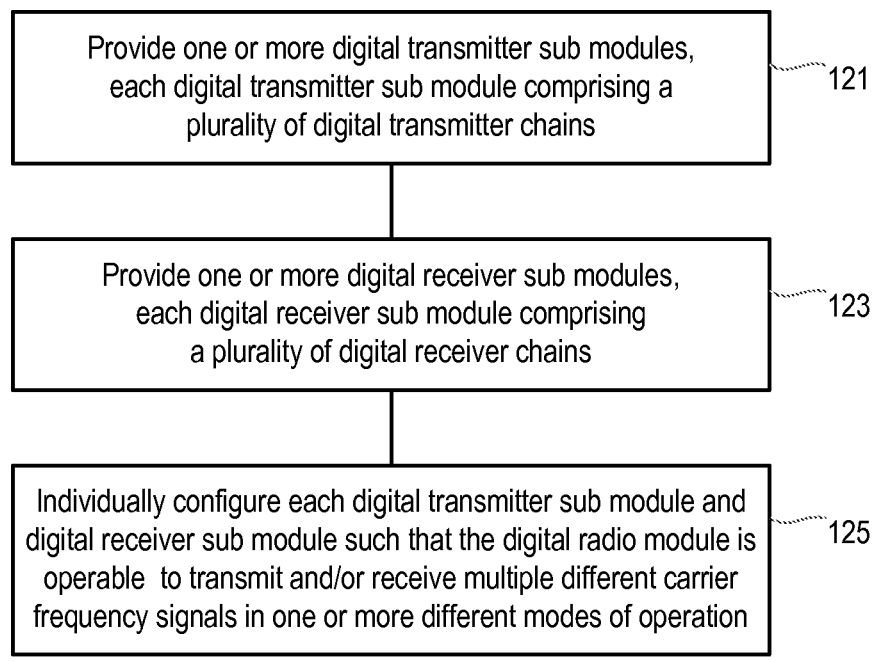
FIG. 1b illustrates a method according to an embodiment of the invention.

FIG. 1b illustrates a method according to an embodiment of the invention, for a digital radio module that comprises a modular architecture for use in a multi-band multi-standard radio communication apparatus that is operable over a wide frequency range. The method comprises the step of providing one or more digital transmitter sub modules, each digital transmitter sub module comprising a plurality of digital transmitter chains, step 121, and providing one or more digital receiver sub modules, each digital receiver sub module comprising a plurality of digital receiver chains, step 123. The method further comprises the step of individually configuring each digital transmitter sub module and digital receiver sub module such that the digital radio module is operable to transmit and/or receive multiple different carrier frequency signals in one or more different modes of operation, step 125.

Figure 2:
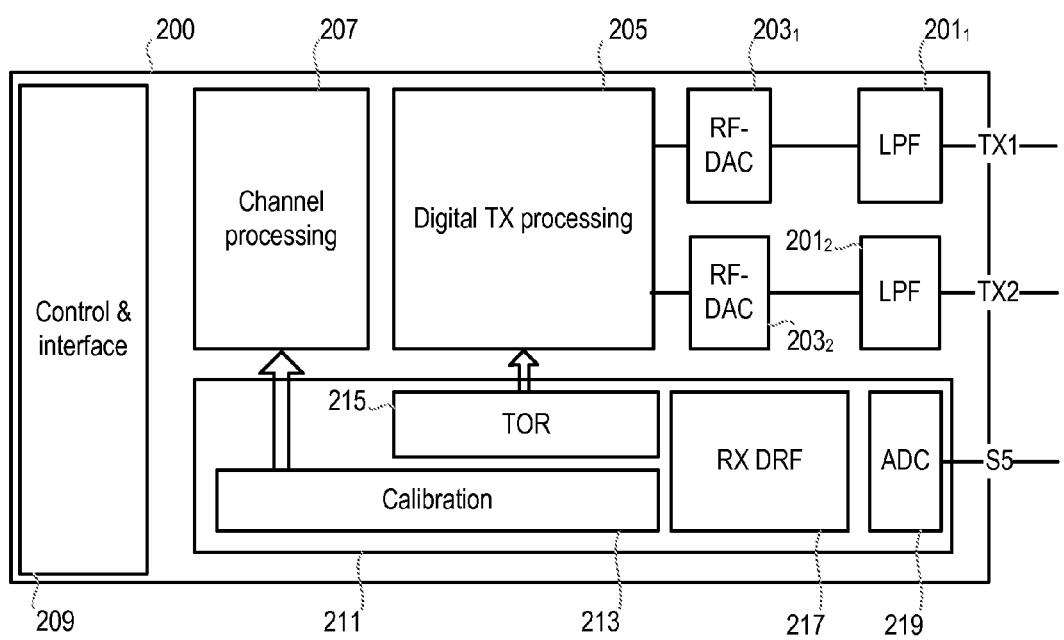
FIG. 2 shows an example of a transmitter sub module according to an embodiment of the invention.

FIG. 2 shows an example of a digital transmitter sub module that may be used in a digital radio module according to an embodiment of the present invention. The digital transmitter sub module 200 is operable to transmit multiple radio frequency bands in a telecommunication system, and comprises a plurality of digital transmitter chains $TX_1$ to $TX_N$ (only $TX_1$ and $TX_2$ being shown for clarity purposes, i.e. N=2, where N corresponds to the number of transmitter signal paths). The digital transmitter 200 can be coupled during use to receive a digital representation of a respective base band signal. A control and interface unit 209 enables the transmitter sub module 200 to be individually configured such that the transmitter sub module is operable to transmit multiple different carrier frequency signals in one or more different modes of operation.

A digital transmitter processing unit 205 is provided, as discussed in greater detail later in the application, to up-convert a plurality of digital baseband signals directly to a plurality of digital radio frequency signals, for example using Direct Radio Frequency Technology, DRF. Each digital RF signal is fed to a RF digital to analogue converter 203 that is adapted to convert the digital radio frequency signal into an analogue radio frequency signal, which is fed to a respective low pass filter 201.

Alternatively, as will be described with some of the other embodiments, a digital combining unit can be provided for combining digital radio frequency signals, on different frequency bands for the same antenna, from the digital transmitter processing unit 205

The digital transmitter processing unit 205 is therefore coupled to receive multiple base band carrier signals from the same or different frequency bands, and is adapted to digitally process the multiple base band carrier signals to produce a digital representation of each base band signal for each of the digital transmitter chains. The digital transmitter processing unit 205 may be configured to perform processing tasks such as crest factor reduction (CFR, CFAR) or digital pre-distortion (DPD). Other processing tasks may also be performed by the processing unit 205.

The transmitter sub module 200 further comprises a feedback unit 211 coupled to monitor an output signal of the transmitter sub module, for example by taking the output of a power amplifier (not shown), or an antenna (also not shown), and adapted to provide a feedback signal to the digital transmitter processing unit 205 and a channel processing unit 207. The feedback unit 211 comprises a digital receiver 217 (for example a DRF receiver) coupled to the output of a power amplifier (or antenna) via a high speed radio frequency ADC 219. The feedback unit 211 also comprises a transmitter observation receiver 215, TOR, coupled to receive an output of the digital receiver 217. As such, a measurement signal, decoupled at the power amplifier (or antenna after the power amplifier) is fed to a digital TOR for RF signal characterization. The characterized RF signal is fed as a feedback signal into the digital transmitter processing unit 205. The function of the digital TOR 215 will be familiar to a person skilled in the art, and is for example described in a paper entitled "Linearizing Power Amplifiers Using Digital Predistortion, EDA Tools and Test Hardware", by Kelly Mekechuk et al, April 2004, *High Frequency Electronics* journal. The TOR 215 preferably comprises a frequency agile multiband capability, for example a wideband reduced dynamic range version of a DRF receiver, such that it can measure the output signal of the transmitter, including the distortion components. It is noted that the dynamic range can be reduced relative to an ordinary RBS receiver as the transmitter signal is measured directly at the output of the transmitter without the additional path loss added in a real system. The TOR 215 can be a digital TOR (DTOR). This DTOR is reused for all carriers in all frequency bands. Thus, this embodiment of the invention has the advantage of enabling a common DTOR to be used for the multiple frequency band signals, within a digital transmitter sub module.

The transmitter sub module 200 is configured such that unwanted RF signals from the DACs 203 are filtered out by the filter units 201. It is noted that the low pass filter units 201 can be realised as a common filter unit, for example a filter unit that performs an anti aliasing filtering function.

The transmitter sub module 200 comprises a channel processing unit 207, which is adapted to process a plurality of base band carriers prior to being processed by the digital transmitter processing unit 205. The channel processing unit 207 is configured to perform, for example, PreCoder functions or Inverse Fast Fourier Transforms (IFFT) on the base band signals. The channel processing unit 207 is fed by base band signals, for different carriers and frequency bands. The channel processing unit 207 receives feedback signals from a calibration unit 213.

Figure 3:
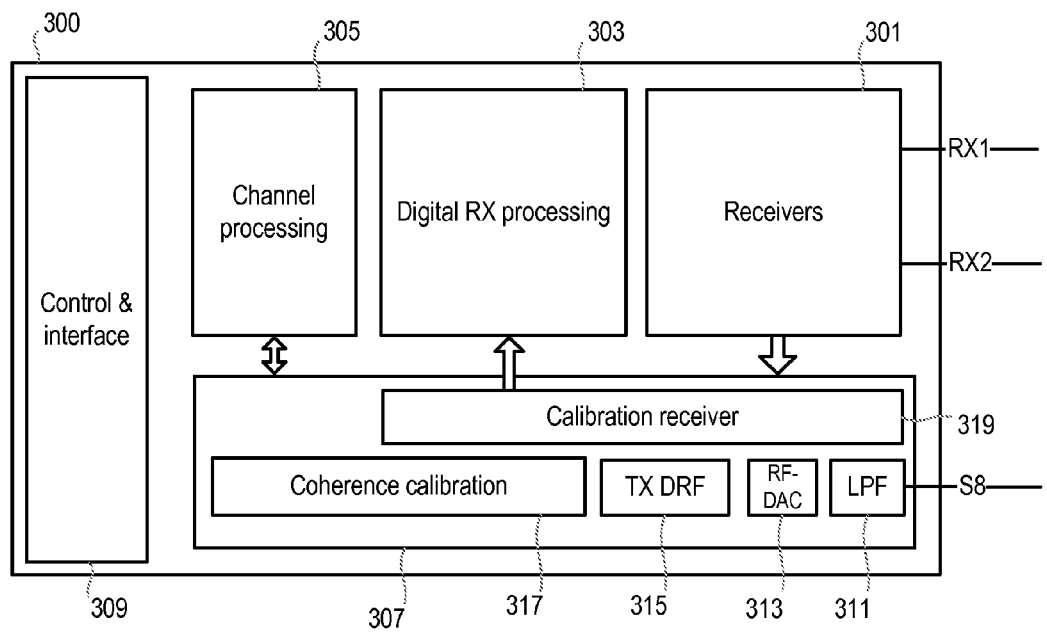
FIG. 3 shows an example of a receiver sub module according to an embodiment of the invention.

The transmitter sub module of FIG. 2 therefore comprises:
A Down Link channel processing circuit supporting J carriers on N transmission paths (although in FIG. 2 only two transmission paths are shown), whereby N relates to the number of antennas or unique signal paths, and J the number of carriers,
Digital transmitter processing J RF carriers utilizing Direct RF technology on N transmission paths,
Radio Frequency Digital to Analogue Converters (RF-DAC), one for each TX path,
Low pass filters (LPF), one for each TX path,
Transmitter Characterization Receiver for power amplification (PA) RF coherence calibration, provided by the calibration unit 213 of FIG. 2,
Transmitter Observation Receiver (TOR) for DPD usage,
Control and interconnect interfaces FIG. 3 shows an example of a digital receiver sub module that may be used in a digital radio module according to an embodiment of the present invention. The receiver sub module 300 comprises a plurality of digital receiver chains $RX_1$ to $RX_M$ (only $RX_1$ and $RX_2$ being shown for clarity purposes, i.e. M=2, where M corresponds to the number of receiver signal paths). Each digital receiver chain is coupled to receive a digital representation of the multiple radio frequency bands, including a particular radio frequency band for processing by the respective digital receiver chain. Each digital receiver chain comprises a digital receiver that is programmable to select a particular radio frequency band from the digital representation of the multiple radio frequency bands, and adapted to down convert the selected radio frequency band into a digital baseband signal associated with the particular radio frequency band, for example using DRF technology. The digital receivers of each chain are represented by the receiver unit 301 in FIG. 3.

The receiver sub module 300 comprises a digital receiver processing unit 303 that is coupled to receive the outputs of the digital receiver unit 301, and adapted to process the digital signals to provide the digital baseband output signals. The digital receiver processing unit 303 may comprise either separate units for each digital receiver chain, or comprise a common processing unit that processes signals in each of the digital receiver chains.

The receiver sub module 300 further comprises a calibration unit 307 comprising a calibration receiver 319. A calibration signal from a coherence calibration unit 307 is transmitted by a transmitter unit 315, for example a DRF transmitter, to a DAC 313 which converts the calibration signal into analogue form for use in calibrating the receiver apparatus, for example by injecting the calibration signal into the input of the receiver, e.g. via an antenna unit (not shown). The output of the RF-DAC 313 may be filtered by a low pass filter 311. Further details about the operation of the calibration unit are provided below, in relation to the embodiments of FIGS. 6 and 9.

A control and interface unit 309 comprises a control unit (not shown) that enables the receiver sub module to be individually configured such that the receiver sub module is operable to receive multiple different carrier frequency signals in one or more different modes of operation.

It can therefore be seen that the receiver sub module according to the embodiment of FIG. 3 comprises:

Up Link Channel processing.

Digital receiver processing for linearization based on RF measurements.

Radio Frequency Analogue to Digital Converters (RF-ADC), one for each RX path.

Receiver Characterization Transmitter (RCT), based on DRF technology, for RF signal generation for receiver RF coherence calibration.

Control and interconnect interfaces.

An implementation of a radio unit and its capabilities are defined by means of the number of transmitter and receiver sub modules which are integrated into digital radio modules, that are used in a particular implementation. A digital radio module can therefore be defined by means of the number of transmitter and receiver sub modules that are used in a specific application. Different implementations of a radio unit may thus use different DRM modules but the same sub modules. A radio unit does not have to be symmetrical, which means that some application can have more transmit antennas than receive antennas, or vice verse. Thus, by having different modules for TX and RX it is possible to optimize the amount of hardware needed for a particular implementation and thus reduce the cost.

Figure 4:
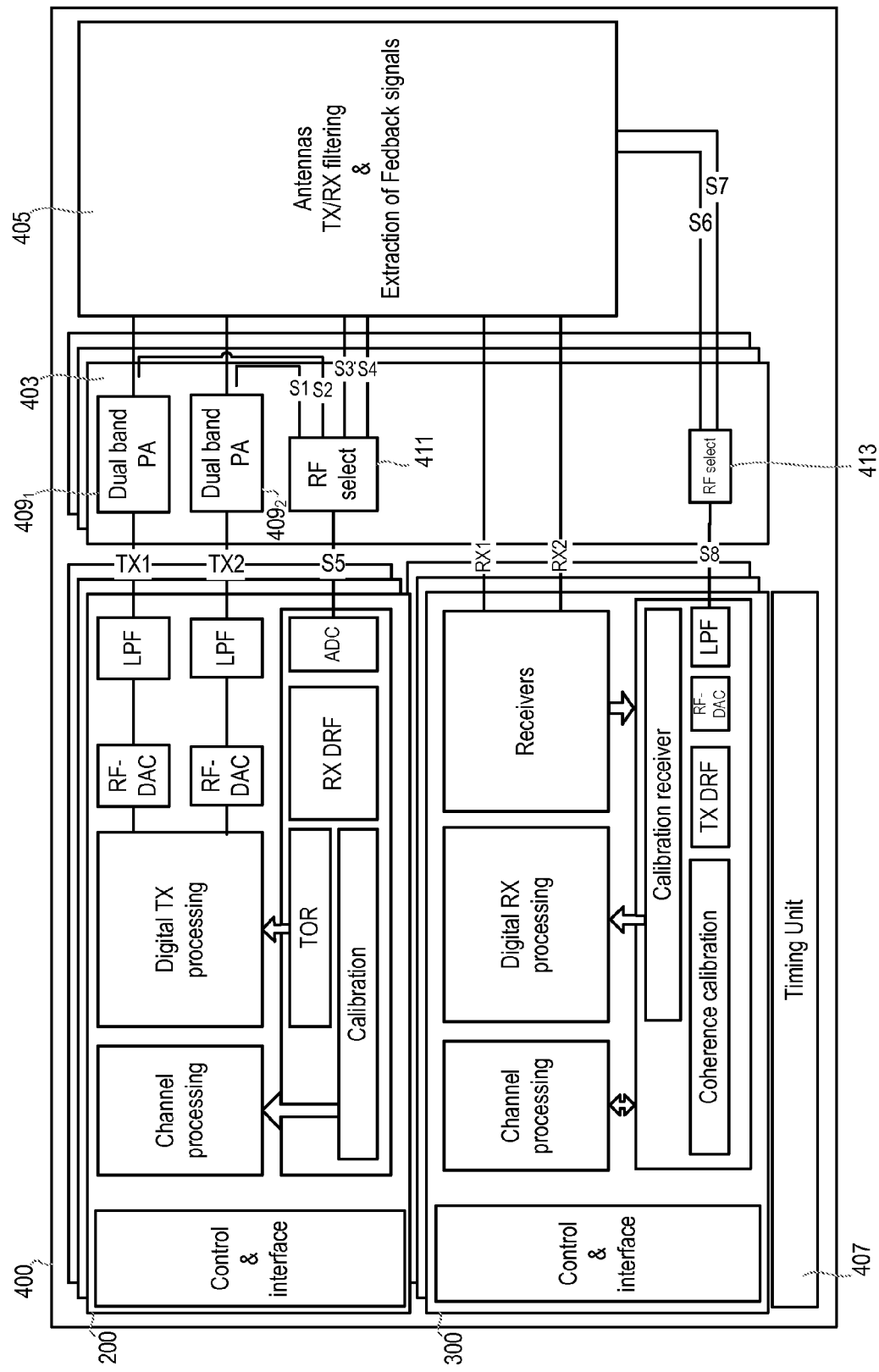
FIG. 4 shows a digital radio module comprising a modular architecture according to another embodiment of the invention.

The architecture of a digital radio module comprising transmitter and receiver sub modules as described in the examples of FIGS. 2 and 3 above is shown in FIG. 4, according to another embodiment of the invention. Such a radio unit 400 comprises a plurality of transmitter sub modules 200 and a plurality of receiver sub modules 300. The radio unit comprises:

N transmitters (in order not to obscure the explanation, only two transmitters TX1 and TX2 have been drawn in FIG. 4, i.e. N=2) which can each transmit on K frequency bands, where N also corresponds to the number of antennas used where each antenna can transmit J carriers in different frequency bands. These transmitters are coupled to a Digital TX (DTX) processing block. The transmitters and the digital processing block form part of what is called a "TX sub module" the details of which have been explained above with reference to FIG. 2, and other embodiments below with reference to FIGS. 5 and 8. The output of each transmitter is coupled to a wide band multi-band multi-carrier power amplifier (for example, dual band in FIG. 4) and N TX filters (block 405 of FIG. 4) and forms part of the down link chain of the radio unit.

M receivers on K frequency bands and comprises Digital RX (DRX) processing blocks, wide band multi-band and multi-carrier receivers and M RX filters in an up link, Processing capabilities for up/down-link base band processing and per antenna element antenna pattern processing, The uplink and downlink chains of the radio unit both comprise calibration and timing blocks for calibration and signal quality measurements, and a timing unit 407 for reference timing generation, TX and RX are connected to an array of TX and RX filters, one filter for each frequency band and to an array of antenna elements (shown as 405 in FIG. 4).

The timing unit is provided because it is important that all signals have the same time reference so that the transmission of signals is performed at the same time++/−dt related to a frame synchronisation, (which are 3 GPP requirements for MIMO and TX diversity). The timing unit is also required for RF coherence, which means that RF from different transmitters are synchronous with some controlled relative phase shift to each other. In order to maintain this coherence it is required that all transmitters have the same time reference.

In an implementation of a radio unit a plurality of digital radio modules, array of Multi band power amplifiers, RF filters and antennas, can be used in order to achieve wanted functionality and performance.

Figure 5:
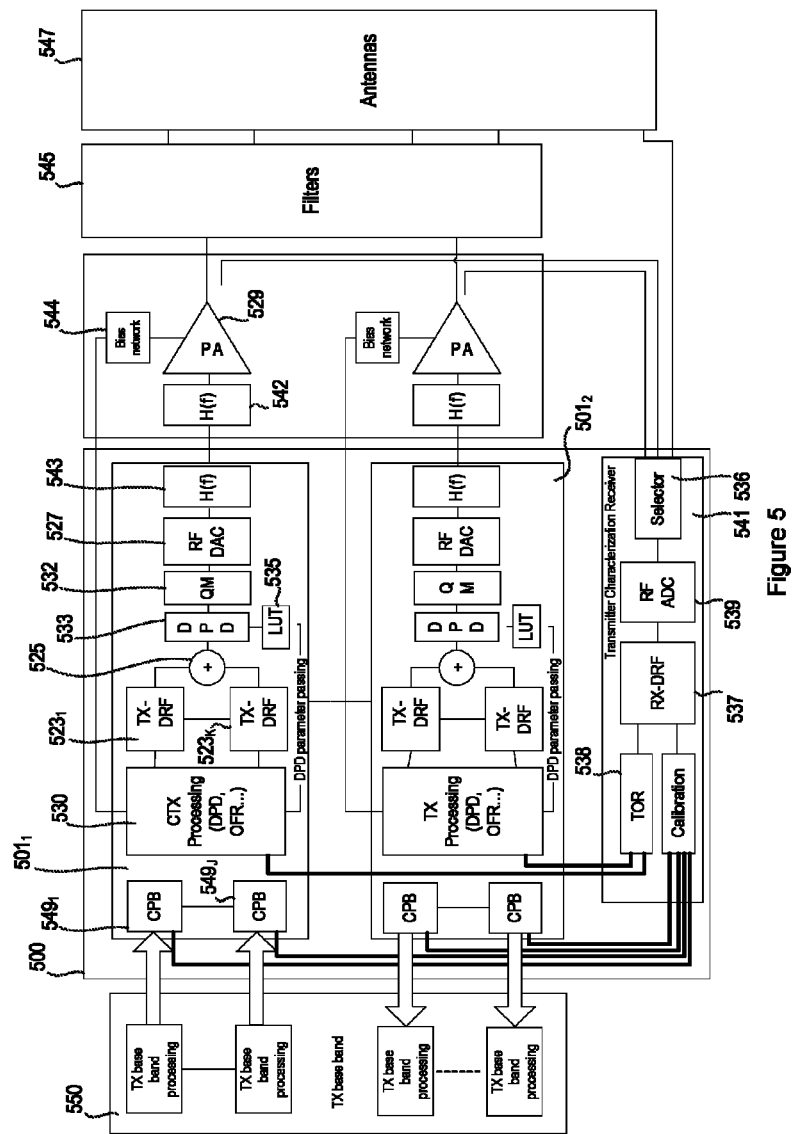
FIG. 5 shows an example of a transmitter sub module for a digital radio module, according to an embodiment of the invention.

A further example of an embodiment of a transmitter sub module based on DRF technology is shown in FIG. 5.

FIG. 5 shows a plurality of digital transmitter sub modules 501 (only two 501$_1$ and 501$_2$ being shown for clarity) that can form part of a digital radio module 500. Each transmitter sub module 501 is operable to transmit multiple radio frequency bands in a telecommunication system, and comprises a plurality of digital transmitter chains 523$_1$ to 523$_K$. Each digital transmitter chain is coupled to receive a digital representation of a respective base band signal. Each digital transmitter chain 523$_1$ to 523$_K$ comprises a digital transmitter that is configured to up-convert a digital baseband signal directly to a digital radio frequency signal, for example using Direct Radio Frequency Technology, DRF.

A digital combining unit 525, for example a digital summing unit, is coupled to receive the output of each digital transmitter chain 523$_1$ to 523$_K$, and adapted to combine the digital radio frequency signals received from each digital transmitter chain 523$_1$ to 523$_K$ into a digital radio frequency signal comprising multiple radio frequency bands.

A digital to analogue converter 543 is coupled to receive the digital radio frequency signal comprising multiple radio frequency bands, and adapted to convert the digital radio frequency signal into an analogue radio frequency signal comprising multiple radio frequency bands.

The transmitter sub module 501 further comprises a common processing unit 530. The common processing unit 530 is coupled to receive multiple base band carrier signals, and is adapted to digitally process the multiple base band carrier signals to produce the digital representation of each base band signal for each of the digital transmitter chains.

It can therefore be seen that the multi band transmitter is fed by base band carrier signals, for different carriers and frequency bands, to the common processing block 530. The common processing block may be configured to perform processing tasks such as crest factor reduction (CFR, CFAR) or digital pre-distortion (DPD) algorithms. The processed (or corrected) base band signal for each frequency band is then fed to a respective DRF digital transmitter that digitally converts the base band signal to digital RF in the right frequency band. The digital RF signals from different frequency bands are combined in the digital combining unit 525 into one signal that is fed to a high speed DAC 527.

The transmitter sub module 501 of FIG. 5 further comprises a digital pre-distortion actuator unit 533 (DPD) coupled between the digital combining unit 525 and the digital to analogue converter 527. The digital pre-distortion unit 533 is configured to modify the digital radio frequency signal comprising multiple radio frequency bands prior to conversion by the digital to analogue converter 527. In order to handle the multiple bands, the digital pre-distortion unit 533 is configured to deal with characteristics of the multiple bands, such as the spacing between bands, the width of each band, the frequency range of each band, and so forth.

A look-up table 535 (LUT) is provided for controlling the operating parameters of the digital pre-distortion unit 533, wherein the look-up table is controlled by the common processing unit 530 using a control signal, for example a feedback signal from a feedback unit 541.

The feedback unit 541 is coupled to monitor an output signal of the transmitter sub module, for example by taking the output of a power amplifier 529, and adapted to provide a feedback signal to the common processing unit 530 of each transmitter sub module 501. Alternatively, the feedback unit 541 can derive its input signal by coupling to a transmit antenna 547 that is fed by the power amplifier 529. The feedback unit 541 comprises a digital receiver 537 (for example a DRF receiver) coupled to the output of the power amplifier 529 (or antenna) via a high speed radio frequency ADC 539. A selector unit 536 is provided for selecting which feedback signal is to be used.

The feedback unit 541 also comprises a transmitter characterisation receiver 538, TCR, coupled to receive an output of the digital receiver 537. As such, a measurement signal, decoupled at the power amplifier (or antenna after the power amplifier) is fed to a digital TCR for RF signal characterization. The characterized RF signal is fed as a feedback signal into the common processing unit 530 for DPD processing. The function of the digital TCR 538 will be familiar to a person skilled in the art.

The transmitter sub module 501 is further adapted such that unwanted RF signals from the DAC 527 are filtered out in a common filter unit 543, for example a filter unit that performs an anti aliasing filtering function. The transmitter sub module 501 therefore comprises a wide band filter unit 543 coupled to the output of the digital to analogue converter 527, the wide band filter unit 543 being adapted to perform an anti aliasing function on the analogue radio frequency signal comprising multiple radio frequency bands. The wide band filter unit 543 has the advantage of being physically small and low cost (that is, small or having an insignificant size in relation to the DAC and the overall transmitter implementation).

The transmitter apparatus may further comprise a plurality of output filter units, for example provided in a common filter unit 545, coupled to the output of the wide band power amplifier 529. Each of the plurality of output filter units is adapted to receive the amplified analogue radio frequency signal comprising multiple radio frequency bands, and adapted to filter a required radio frequency band for coupling to an antenna 547. The frequency specific output filter units filter out respective wanted RF signals, which are combined and fed to the transmitter antenna 547.

The transmitter sub module 501 further comprises a plurality of base band carrier processing units $549_1$ to $549_J$, where J equals the number of carriers, each base band carrier processing unit adapted to process a base band carrier signal prior to being processed by the common processing unit 530. The plurality of base band carrier processing units $549_1$ to $549_J$, may perform, for example, PreCoder functions or Inverse Fast Fourier Transforms (IFFT) on the base band signals. The plurality of base band carrier processing units $549_1$ to $549_J$ are fed by base band signals, for different carriers and frequency bands. Further base band processing may be provided by a transmitter base band processing unit 550.

It is noted that the common processing unit 530 comprises a control unit (not shown) that enables the transmitter sub module 501 to be individually configured such that the transmitter sub module is operable to transmit multiple different carrier frequency signals in one or more different modes of operation.

In the transmitter of FIG. 5, it can therefore be seen that one end (the left side) is connected to base band and at the other end (right side) connected to a RF power amplifier that handles all carriers. A feedback signal from either the power amplifier 529 or from the antenna element 547 is connected to the common transmitter characterization receiver (TCR) for Digital Pre-Distortion (DPD) and calibration measurements. The feedback signal to the TCR is selected by means of an analogue selector 536. The feedback signal from the power amplifier 529 is used for DPD measurements and the feedback signal from the antenna element 547 is used for calibration measurements.

The transmitter architecture supports N logical transmitter chains and comprises N transmitter processing blocks in the form of a Common TX (CTX) processing block, N TX-DRF blocks, a RF-DAC, an anti-aliasing filter that is divided into two parts, a low pass and a high pass filter, a wide band power amplifier 529 and N transmitter filters. The band pass filter is divided into two parts in order to achieve a frequency agnostic DRM. For calibration and pre-distortion measurements a Digital Transmit Observation Receiver (DTOR) is used. There is one transmitter chain per supported antenna where each chain supports K frequency bands and J carriers, where N is the number of antennas or unique signal paths, K is the number of frequency bands, and J is the number of carriers that can be transmitted in each frequency band.

It can therefore be seen that the digital transmitter sub module of the embodiment of FIG. 5 comprises:

Optional Base band processing resources, shown as block 550,

TX Carrier processing, shown as block 549, performing up-sampling, and channel filtering A common TX processing block 530 that simultaneous on all carriers performs processing tasks such as CFR and pre-distortion, TX-DRF processing block 523 that up-converts the input signal to RF frequency by means of clocking a DAC with a RF signal, A low pass filter that is part of the anti aliasing filter, shown as block 542, The output from the digital transmitter is converted to an analogue signal by means of the high speed digital to analogue converter 527, and unwanted signals are filtered out by means of the high pass filter 543, which forms part of the anti-aliasing filter. It should be noted that the anti aliasing filters are divided into two parts: a low pass filter and a high pass filter The multi band transmitter sub module is therefore fed by base band signals, for different carriers and frequency bands, to the common processing block 530, where CFR and DPD processing are performed. The corrected signal for each frequency band is then fed to the DRF transmitter branches 523 that digitally convert the signals to a digital RF signal in the right frequency band.

The transmitter characterization receiver, TCR, 541 is a shared resource for calibration and power amplifier linearization measurements. One signal for calibration measurements is decoupled at the antenna after a combiner, and a feedback signal from the output of the power amplifier 529 is fed to the TCR 541 for RF signal characterization in the transmitter observation transmitter calibration block. The characterization receiver is configured to operate in two modes, one for linearization and one for calibration purposes. The input signal is selected by integrated switches, using the selector block 536. The characterized RF signal is fed into the common transmitter processing block 530 of each transmitter sub module 501 for CFR and DPD processing. The TCR 541 is reused for all carriers in all frequency bands. The TCR 541 uses reference signals (not shown) from the common transmitter processing block.

The TCR block 541, that measures the RF quality, based on the reference signal, on each of the J carriers at the physical antenna port, comprises a high speed ADC 539, Receiver DRF 537 and signal signature characterization for DPD and calibration usage.

Figure 6:
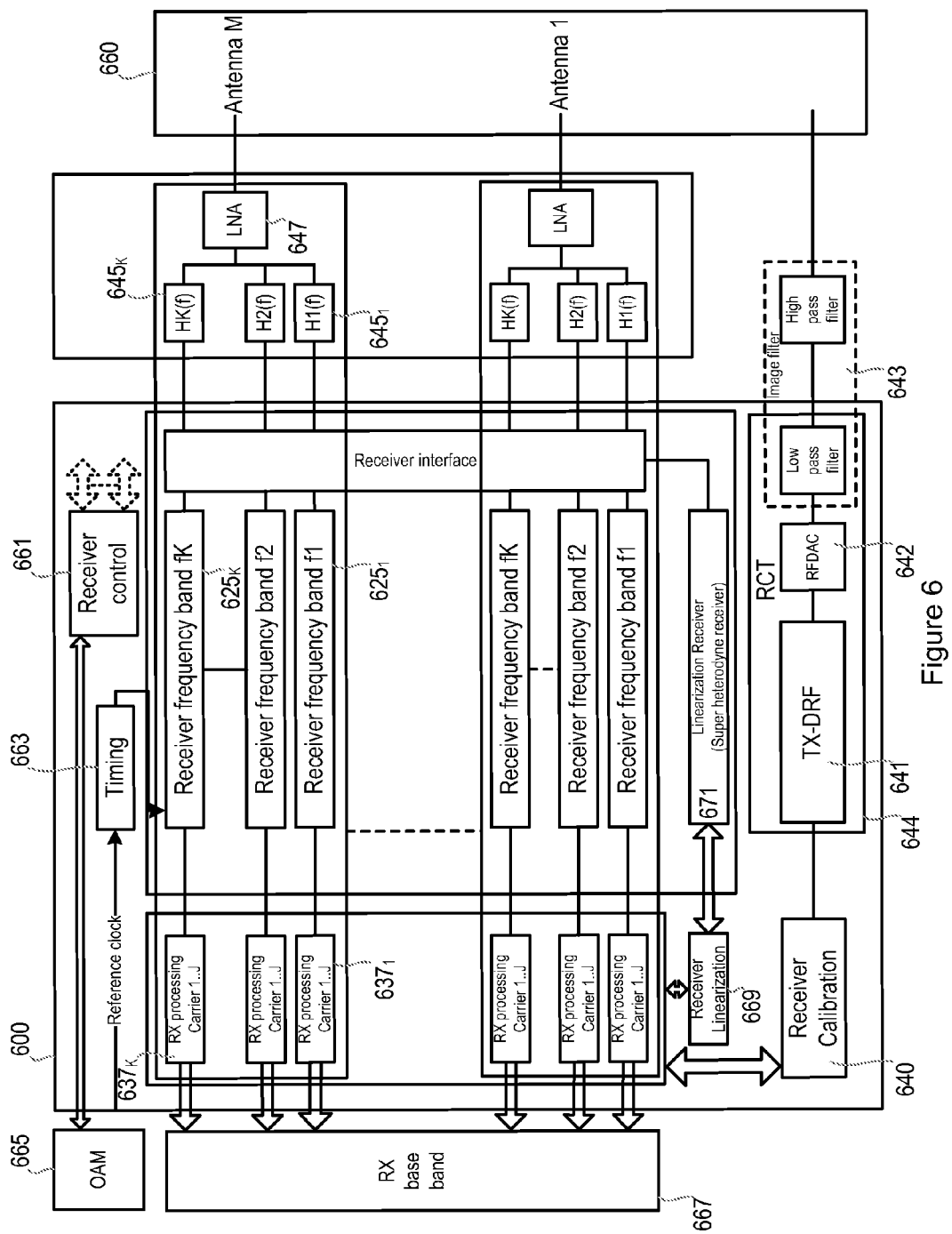
FIG. 6 shows an example of a receiver sub module, according to another embodiment of the invention.

FIG. 6 shows a receiver 600 comprising a plurality of receiver sub modules according to another embodiment of the present invention. Each receiver sub module comprises a plurality of digital receiver chains $625_1$ to $625_K$, each digital receiver chain $625_1$ to $625_K$ coupled to receive a digital representation of the multiple radio frequency bands (from a receiver interface 629), including a particular radio frequency band for processing by the respective digital receiver chain. Each digital receiver chain $625_1$ to $625_K$ comprises a digital receiver that can be programmed to select a particular radio frequency band from the digital representation of the multiple radio frequency bands, and adapted to down convert the selected radio frequency band into a digital baseband signal associated with the particular radio frequency band, for example using DRF technology.

Each digital receiver chain in a sub module comprises a digital processing unit $637_1$ to $637_K$ coupled to receive the output of a respective digital receiver, and adapted to process the digital signal to provide the digital baseband output signal. The digital processing units may either be separate units for each digital receiver chain, or part of a common processing unit that processes signals in each of the digital receiver chains.

The receiver sub module 600 further comprises a calibration stage comprising a calibration receiver 640 and a calibration transmitter 641. The calibration stage is configured to correct the I and Q signals at a base band level, and in particular one or more of phase, amplitude or delay in the respective digital receiver chains in order to achieve RF coherence. The calibration receiver 640 is configured to generate a calibration signal which is transmitted using the calibration transmitter 641 into the incoming signal path of the receiver, for example into an antenna (not shown) which feeds the receiver. The same calibration signal is detected in each of the digital receiver chains $625_1$ to $625_K$ and coupled as a set of feedback signals, or measured signals to the input of the calibration receiver 640, thereby providing feedback signals to the calibration receiver 640. The calibration signal is detected or measured in each of the digital chains $625_1$ to $625_K$ using the plurality of digital processing units $637_1$ to $637_K$, with the measured signals being coupled to the input of the calibration receiver 640. The measured signals received by the calibration receiver 640 are compared with each other, for example using a MSR receiver, with one or more of phase, amplitude and delay parameters being calculated relative to one of the receiver signals. For example, according to one embodiment the phase, amplitude and delay of each of the received calibration signals are compared with one of the received calibration signals, for example all compared with the calibration signal received from a first digital receiver chain. Correction parameters are then determined, and used to adjust the phase, amplitude and/or delay parameters of one or more of the respective outputs of the digital receivers in the digital receiver chains $625_1$ to $625_K$, according to the result of the comparison step. The adjusting operation may comprise adding or subtracting correction parameters to the outputs of one or more of the digital receivers. For example, if the comparison process is made with respect to the output of digital receiver $625_1$, then correction parameters are added or subtracted to the phase, amplitude and/or delay of one or more of the output signals of digital receivers $625_2$ to $625_K$. By adjusting the phase, amplitude and/or delay parameters of one or more of the output signals of the digital receivers $625_1$ to $625_K$, this enables RF coherence to be achieved between the different digital receiver chains.

Figure 9:
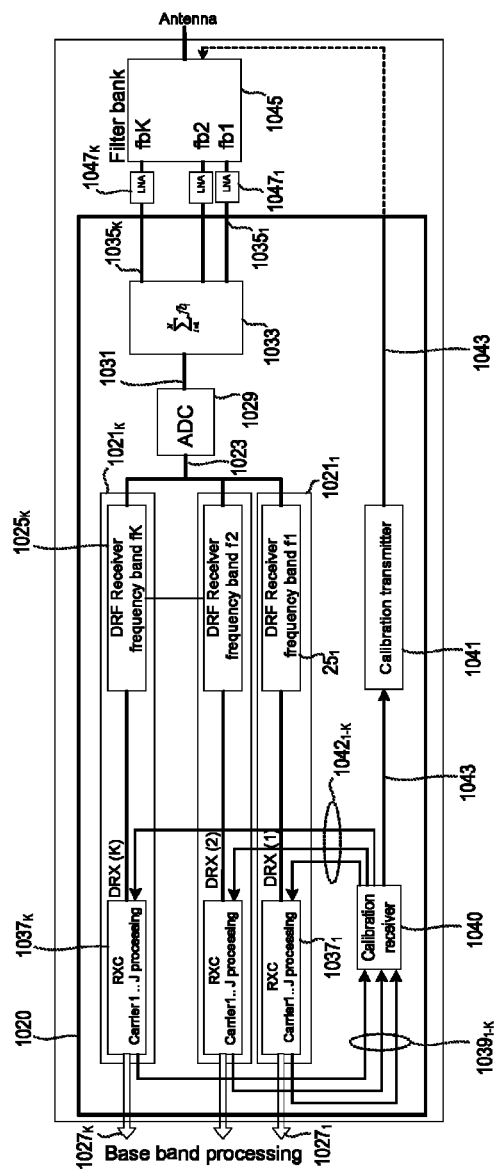
FIG. 9 shows an example of a multiple band receiver sub module according to another embodiment.

Further details of the calibration stage are provided in relation to the embodiment of FIG. 9.

FIG. 6 also shows a filter unit 645 that is configured to receive a radio signal including the multiple radio frequency bands, in analogue form, for example from one or more antennas 660. The filter unit 645 comprises a plurality of filters $645_1$ to $645_K$ for separating the received radio signal into multiple analogue radio frequency signals. It is noted that these filters, for example bandpass filters, can be arranged as separate filters or as an array of switchable filters, in the filter unit or bank 645.

A plurality of amplifier units 647 can be provided (for example low noise amplifiers, LNAs), the plurality of amplifier units 647 being coupled to receive the multiple analogue radio frequency signals and amplify the analogue radio frequency signals prior to being processed by the receiver interface 629. This has the advantage of improving the signal to noise level.

As an alternative for the separate amplifier units 647, a common amplifier unit (such as a common LNA) may be provided instead of band specific amplifier units.

FIG. 6 therefore shows a multi band multi antenna receiver block which is connected to the logical receiver path in the digital radio module. The receivers may be implemented as digital domain receivers utilizing Direct Radio Frequency (DRF) technology.

When digital receivers utilizing DRF technology are used, the input signal from the antenna/filter is converted to the digital domain by means of an ADC that is transferred to a digital processing block where the virtual receivers are implemented.

The receivers 625 of FIG. 6 are connected to an receiver processing block 637 where receiver signal correction, channelizing and filtering for each carrier and antenna signal is performed. The signal correction parameters are calculated in the receiver calibration block 640.

The receiver processing block also detects the measurement signal, used for calibration, that is generated in the Receiver Calibration Transmitter (RCT) 644 and injected into each RF signal in the path for each receiver. The detected feedback signal, from each receiver, is transferred to the RCT 644, for calculation of correction parameters.

Figure 7:
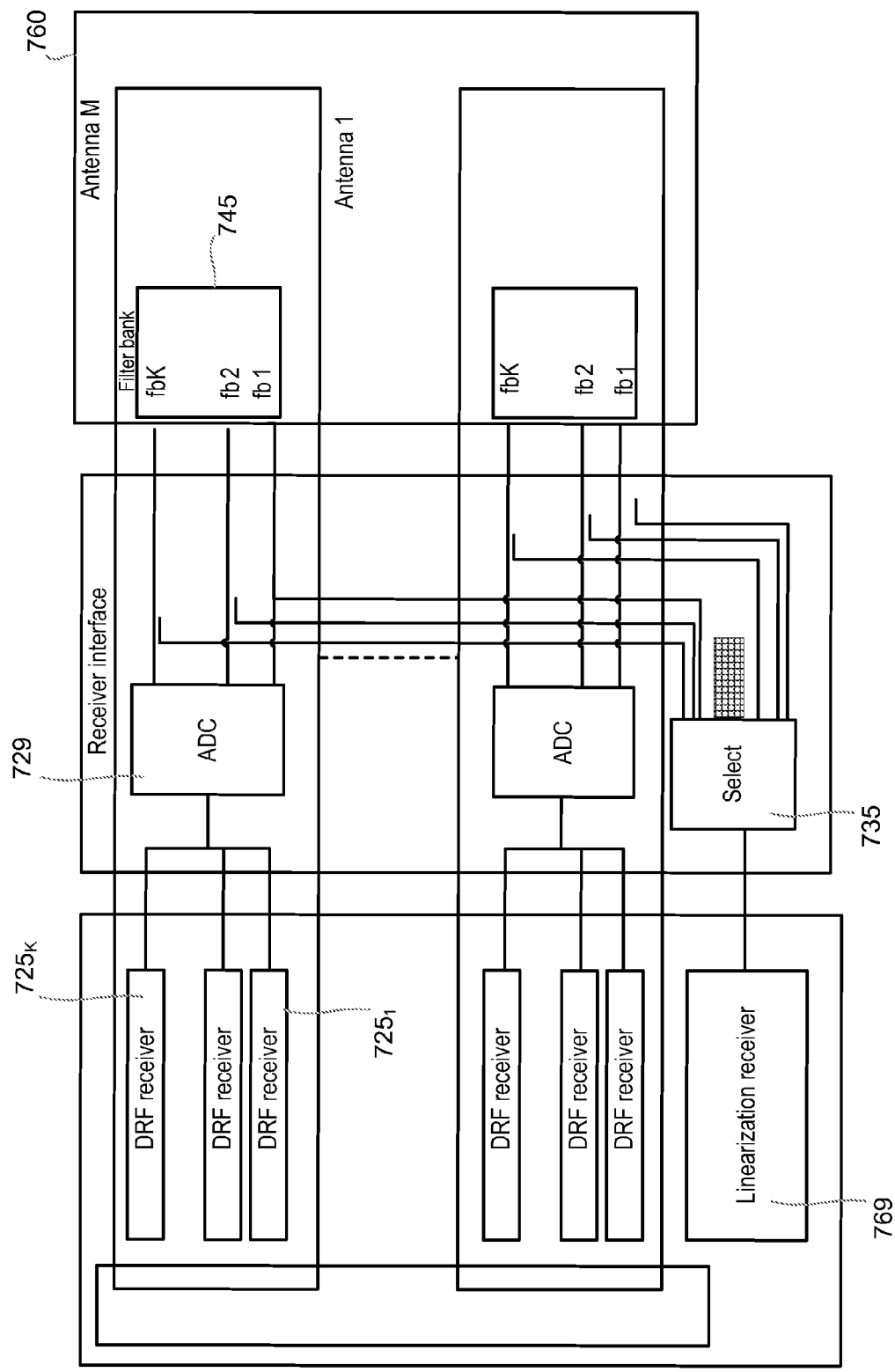
FIG. 7 shows an example of a receiver interface for DRF-based receivers, according to an embodiment of the invention.

A further example of a architecture of a receiver part of a digital radio module, according to another embodiment, is shown in FIG. 7. An antenna block 760 comprises a plurality of filter banks 745 for filtering a received signal into a plurality of analogue RF signals for each respective receiver sub module. The analogue RF signals are converted to digital format by respective ADC's 729 for each receiver sub module. Each receiver sub module comprises a plurality of digital receiver chains, each comprising a digital receiver $725_1$ to $725_K$, such as a DRF receiver, for converting the digital RF signals into base band signals. FIG. 7 shows a common linearization block 769 for all of the digital receiver sub modules, with feedback signals being selected by a selector block 735.

Figure 8:
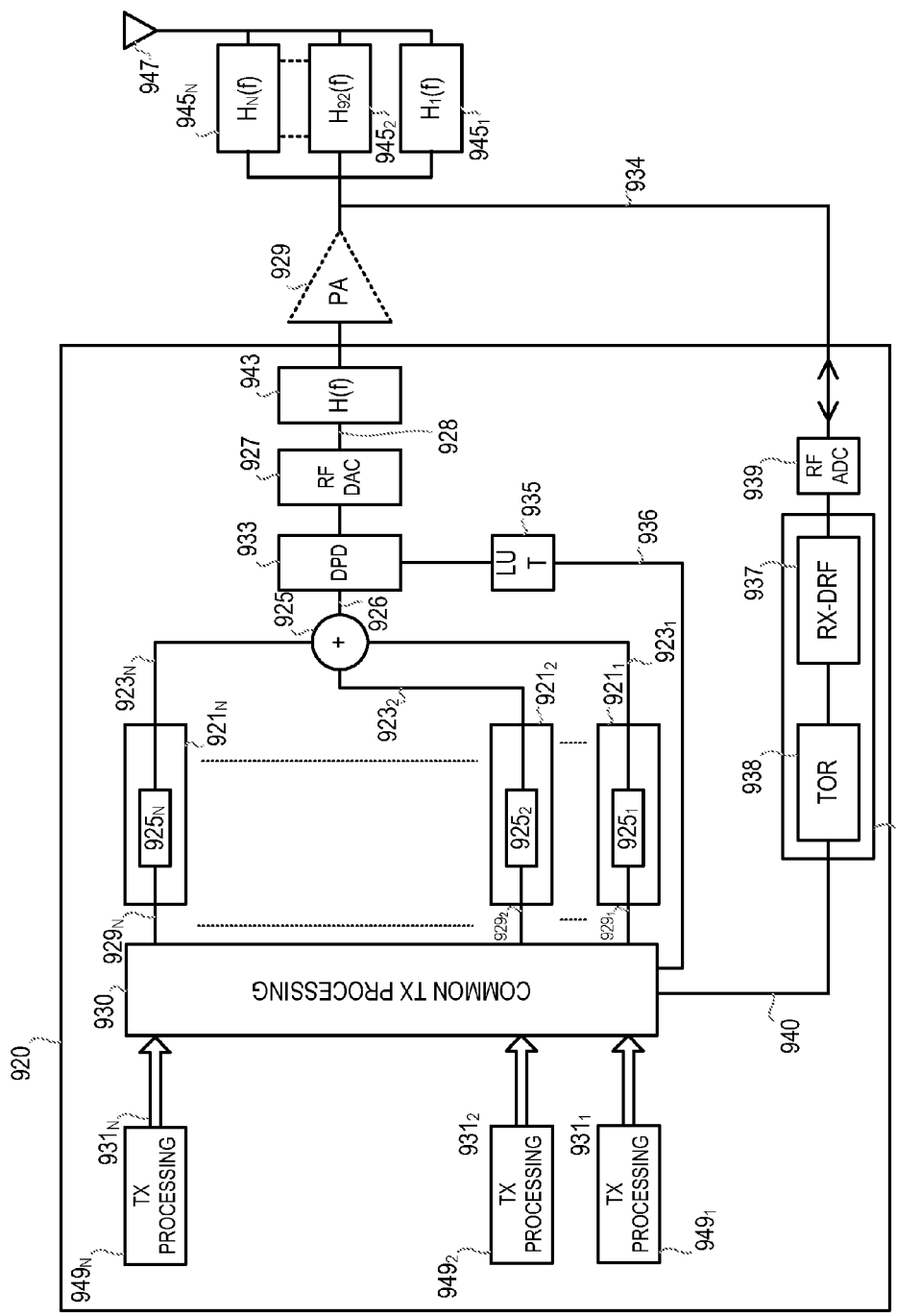
FIG. 8 shows an example of a multiple band transmitter sub module according to another embodiment.

FIG. 8 shows an example of a transmitter sub module that may be used in a digital radio module according to another embodiment of the present invention. The transmitter sub module 920 is operable to transmit multiple radio frequency bands in a telecommunication system, and comprises a plurality of digital transmitter chains $921_1$ to $921_N$. Each digital transmitter chain is coupled to receive a digital representation $927_1$ to $927_N$ of a respective base band signal. Each digital transmitter chain $921_1$ to $921_N$ comprises a digital transmitter $925_1$ to $925_N$ that is configured to up-convert a digital baseband signal directly to a digital radio frequency signal $923_1$ to $923_N$. For example, the digital transmitter $925_1$ to $925_N$ of FIG. 9 may comprise a digital transmitter that is configured to up-convert a digital base band signal directly to a radio frequency signal using Direct Radio Frequency Technology, DRF.

A digital combining unit 925, for example a digital summing unit, is coupled to receive the output of each digital transmitter chain $921_1$ to $921_N$, and adapted to combine the digital radio frequency signals $923_1$ to $923_N$ received from each digital transmitter chain $921_1$ to $921_N$ into a digital radio frequency signal 926 comprising multiple radio frequency bands.

A digital to analogue converter 927 is coupled to receive the digital radio frequency signal 926 comprising multiple radio frequency bands, and adapted to convert the digital radio frequency signal 926 into an analogue radio frequency signal 928 comprising multiple radio frequency bands.

The transmitter sub module 920 further comprises a common processing unit 930. The common processing unit 930 is coupled to receive multiple base band carrier signals $931_1$ to $931_N$, and is adapted to digitally process the multiple base band carrier signals to produce the digital representation $929_1$ to $929_N$ of each base band signal for each of the digital receiver chains.

It can therefore be seen that the multi band transmitter is fed by base band carrier signals, for different carriers and frequency bands, to the common processing block 930. The common processing block may be configured to perform processing tasks such as crest factor reduction (CFR, CFAR) or digital pre-distortion (DPD). The processed (or corrected) base band signal for each frequency band is then fed to a respective DRF digital transmitter that digitally converts the base band signal to digital RF in the right frequency band. The digital RF signals from different frequency bands are combined in the digital combining unit 925 into one signal 926 that is fed to the high speed DAC 927.

The transmitter sub module 920 of FIG. 8 further comprises a digital pre-distortion unit 933 (DPD) coupled between the digital combining unit 925 and the digital to analogue converter 927. The digital pre-distortion unit 933 is configured to modify the digital radio frequency signal 926 comprising multiple radio frequency bands prior to conversion by the digital to analogue converter 927. In order to handle the multiple bands, the digital pre-distortion unit 933 is configured to deal with characteristics of the multiple bands, such as the spacing between bands, the width of each band, the frequency range of each band, and so forth.

A look-up table 935 (LUT) is provided for controlling the operating parameters of the digital pre-distortion unit 933, wherein the look-up table is controlled by the common processing unit 930 using a control signal 936. The control signal 936 may be based on a feedback signal received by the common processing unit 930.

The transmitter sub module 920 further comprises a feedback unit 941 coupled to monitor an output signal of the transmitter sub module, for example by taking the output of a power amplifier 929, and adapted to provide a feedback signal 940 to the common processing unit 930. Alternatively, the feedback unit 941 can derive its input signal by coupling to a transmit antenna (not shown) that is fed by the power amplifier 929. The feedback unit 941 comprises a digital receiver 937 (for example a DRF receiver) coupled to the output of the power amplifier 929 (or antenna) via a high speed radio frequency ADC 939. The feedback unit 941 also comprises a transmitter observation receiver 938, TOR, coupled to receive an output of the digital receiver 937. As such, a measurement signal, decoupled at the power amplifier (or antenna after the power amplifier) is fed to a digital TOR for RF signal characterization. The characterized RF signal is fed as a feedback signal 940 into the common processing unit 930 for DPD processing. The function of the digital TOR 938 will be familiar to a person skilled in the art. The TOR 938 preferably comprises a frequency agile multiband capability, for example a wideband reduced dynamic range version of a DRF receiver, such that it can measure the output signal of the transmitter, including the distortion components. It is noted that the dynamic range can be reduced relative to an ordinary RBS receiver as the transmitter signal is measured directly at the output of the transmitter without the additional path loss added in a real system. The TOR 938 can be a digital TOR (DTOR). This DTOR is reused for all carriers in all frequency bands. Thus, this embodiment of the invention has the advantage of enabling a common DTOR to be used for the multiple frequency band signals. Reference signals from a common TX processing block are not shown in FIG. 8 for clarity purposes.

The transmitter sub module 920 is further adapted such that unwanted RF signals from the DAC 927 are filtered out in a common filter unit 943, for example a filter unit that performs an anti aliasing filtering function. The transmitter sub module 920 therefore comprises a wide band filter unit 943 coupled to the output of the digital to analogue converter 927, the wide band filter unit 943 being adapted to perform an anti aliasing function on the analogue radio frequency signal 928 comprising multiple radio frequency bands. The wide band filter unit 943 has the advantage of being physically small and low cost (that is, small or having an insignificant size in relation to the DAC and the overall transmitter implementation).

The transmitter sub module 920 may further comprise a plurality of output filter units $945_1$ to $945_N$ coupled to the output of a wide band power amplifier 929. Each of the plurality of output filter units is adapted to receive the amplified analogue radio frequency signal 928 comprising multiple radio frequency bands, and adapted to filter a required radio frequency band for coupling to an antenna 947. The frequency specific output filter units filter out respective wanted RF signals, which are combined and fed to the transmitter antenna 947. It is noted that the power amplifier 929 and filters can be separate entities while the filters can be seen as a sub module with at least one filter unit. By having several filters in the filter sub module the system can be prepared to handle several frequency bands.

The transmitter sub module 920 further comprises a plurality of base band carrier processing units $949_1$ to $949_N$, each base band carrier processing unit adapted to process a base band carrier signal prior to being processed by the common processing unit 930. The plurality of base band carrier processing units $949_1$ to $949_N$ may perform, for example, Pre-Coder functions or Inverse Fast Fourier Transforms (IFFT) on the base band signals. The plurality of base band carrier processing units $949_1$ to $949_N$ are fed by base band signals, for different carriers and frequency bands.

The common processing unit 930 comprises a control unit (not shown) that enables the transmitter sub module to be individually configured such that the transmitter sub module is operable to transmit multiple different carrier frequency signals in one or more different modes of operation.

In the embodiment of FIG. 8 it can therefore be seen that each digital transmitter chain comprises a digital transmitter that is configured convert a respective digital base band signal directly into a digital radio frequency signal, with the digital transmitter sub module comprising a digital combining unit coupled to receive the output of each digital transmitter chain, and adapted to combine the digital radio frequency signal received from each digital transmitter chain into a digital radio frequency signal comprising multiple radio frequency bands, with a digital to analogue converter coupled to receive the digital radio frequency signal comprising multiple radio frequency bands, and adapted to convert the digital radio frequency signal into an analogue radio frequency signal comprising multiple radio frequency bands.

The digital transmitter sub module of FIG. 8 further comprises a common processing unit, the common processing unit coupled to receive a plurality of base band carrier signals, and adapted to digitally process the plurality of base band carrier signals to produce the digital representation of each base band signal for each of the digital transmitter chains. A digital pre-distortion unit, DPD, coupled between the digital combining unit and the digital to analogue converter, is provided for modifying the digital radio frequency signal comprising multiple radio frequency bands prior to conversion by the digital to analogue converter.

A common characterization and/or linearization unit is provided for the plurality of digital transmitter sub modules, wherein the common characterization and/or linearization unit is adapted to monitor the output of a power amplifier or antenna being fed by a digital transmitter sub module, and adapted to provide feedback signals to the common processing unit. The common characterization and/or linearization unit comprises: a digital receiver coupled to the output of the power amplifier or antenna; and a transmitter observation receiver coupled to receive an output of the digital receiver, and provide the feedback signals to the common processing unit.

FIG. 9 shows a receiver sub module 1020 according to another embodiment of the present invention. The receiver sub module 1020 comprises a plurality of digital receiver chains $1021_1$ to $1021_K$, each digital receiver chain $1021_1$ to $1021_K$ coupled to receive a digital representation 1023 of the multiple radio frequency bands, including a particular radio frequency band for processing by the respective digital receiver chain. Each digital receiver chain $1021_1$ to $1021_K$ comprises a digital receiver $1025_1$ to $1025_K$ that is programmable to select a particular radio frequency band from the digital representation 1023 of the multiple radio frequency bands, and adapted to down convert the selected radio frequency band into a digital baseband signal $1027_1$ to $1027_K$ associated with the particular radio frequency band, for example using DRF technology. The radio communication receiver apparatus 1020 comprises an analogue to digital converter 1029 coupled to receive an analogue signal 1031 comprising the multiple radio frequency bands, and adapted to output the digital representation 1023 of the multiple radio frequency bands to each digital receiver chain $1021_1$ to $1021_K$.

The receiver sub module 1020 comprises a combining unit 1033 coupled to receive analogue radio frequency signals $1035_1$ to $1035_K$, and adapted to combine the multiple analogue radio frequency signals $1035_1$ to $1035_K$ into the analogue signal 1031 comprising multiple radio frequency bands for processing by the analogue to digital converter 1029. As an alternative to the common analogue to digital converter 1029, separate analogue to digital converters may be provided in each digital receiver chain, each analogue to digital converter being adapted to receive an analogue signal 1031 comprising the multiple radio frequency bands, and adapted to output the digital representation 1023 of the multiple radio frequency bands to its respective digital receiver chain $1021_1$ to $1021_K$.

Each digital receiver chain in the receiver sub module 1020 comprises a digital processing unit $1037_1$ to $1037_K$ coupled to receive the output of a respective digital receiver $1025_1$ to $1025_K$, and adapted to process the digital signal to provide the digital baseband output signal $1027_1$ to $1027_K$. The digital processing units may either be separate units for each digital receiver chain, or part of a common processing unit that processes signals in each of the digital receiver chains.

The receiver sub module 1020 further comprises a calibration stage comprising a calibration receiver 1040 and a calibration transmitter 1041. The calibration stage is configured to correct the I and Q signals at a base band level, and in particular one or more of phase, amplitude or delay in the respective digital receiver chains in order to achieve RF coherence. The calibration receiver 1040 is configured to generate a calibration signal 1043 which is transmitted using the calibration transmitter 1041 into the incoming signal path of the receiver 1020, for example into an antenna (not shown) which feeds the combining unit 1033. The same calibration signal is detected in each of the digital receiver chains $1021_1$ to $1021_K$ and coupled as a set of feedback signals, or measured signals $1039_{1-K}$ to the input of the calibration receiver 1040, thereby providing feedback signals to the calibration receiver 1040. The calibration signal is detected or measured in each of the digital chains $1021_1$ to $1021_K$ using the plurality of digital processing units $1037_1$ to $1037_K$, with the measured signals $1039_{1-K}$ being coupled to the input of the calibration receiver 1040. The measured signals $1039_{1-K}$ received by the calibration receiver 1040 are compared with each other, for example using a MSR receiver, with one or more of phase, amplitude and delay parameters being calculated relative to one of the receiver signals. For example, according to one embodiment the phase, amplitude and delay of each of the received calibration signals are compared with one of the received calibration signals, for example all compared with the calibration signal received from the first digital receiver chain $1021_1$. Correction parameters $1042_{1-K}$ are then determined, and used to adjust the phase, amplitude and/or delay parameters of one or more of the respective outputs of the digital receivers $1025_1$ to $1025_K$, according to the result of the comparison step. The adjusting operation may comprise adding or subtracting correction parameters to the outputs of one or more of the digital receivers $1025_1$ to $1025_K$. For example, if the comparison process is made with respect to the output of digital receiver $1025_1$, then correction parameters are added or subtracted to the phase, amplitude and/or delay of one or more of the output signals of digital receivers $1025_2$ to $1025_K$.

By adjusting the phase, amplitude and/or delay parameters of one or more of the output signals of the digital receivers $1025_1$ to $1025_K$, this enables RF coherence to be achieved between the different digital receiver chains.

The calibration process can be run during a calibration mode of operation, during which the calibration signal 1043 is used to determine what correction parameters, if any, are needed to the various digital receiver chains. These correction parameters are then used to correct the different frequency band signals based on the actual working of the various digital receiver chains. The calibration mode of operation can be run periodically, and the correction parameters set accordingly.

The calibration stage is therefore adapted, during a calibration mode of operation, to transmit a calibration signal to the input of the receiver apparatus, and adapted to detect the phase, amplitude and/or delay of the calibration signal after being converted to a baseband signal in each digital receiver chain $1021_1$ to $1021_K$. The detected signal from each digital receiver chain provides a set of feedback signals for use by the calibration stage to define a set of correction parameters, wherein the set of correction parameters are used by the digital processing unit $1037_1$ to $1037_K$ to adjust one or more of the phase, amplitude and/or delay of a base band signal in one or more of the digital receiver chains.

It can be seen that the calibration stage comprises a calibration transmitter for coupling the calibration signal to an input of the receiver, and a calibration receiver for receiving the set of feedback signals from each digital receiver chain, wherein the calibration receiver is adapted to compare the phase, amplitude and/or delay of each of the set of feedback signals, and determine the set of correction parameters based on the comparison.

The receiver sub module 1020 further comprises a filter unit 1045. The filter unit 1045 is configured to receive a radio signal including the multiple radio frequency bands, in analogue form, for example from one or more antennas. The filter unit 1045 comprises a plurality of filters fb1 to fbK for separating the received radio signal into multiple analogue radio frequency signals $1035_1$ to $1035_K$. It is noted that these filters, for example bandpass filters, can be arranged as separate filters or as an array of switchable filters, in the filter unit or bank 1045.

A plurality of amplifier units $1047_1$ to $1047_K$ can be provided (for example low noise amplifiers, LNAs), the plurality of amplifier units $1047_1$ to $1047_K$ being coupled to receive the multiple analogue radio frequency signals $1035_1$ to $1035_K$ and amplify the analogue radio frequency signals $1035_1$ to $1035_K$ prior to being combined by the combining unit 1033. This has the advantage of improving the signal to noise level.

As an alternative for the separate amplifier units $1047_1$ to $1047_K$, a common amplifier unit 1047 (such as a common LNA) may be provided instead of band specific amplifier units $1047_1$ to $1047_K$. In such an embodiment the summation or combining can be made by providing an RF combining unit at the input of the common amplifier unit 1047 (for example at the input of a common LNA).

The embodiment above provides a receiver sub module architecture that comprises K digital receiver (DRX) chains $1021_1$ to $1021_K$, comprising Receiver Carrier (RXC) processing blocks $1037_1$ to $1037_K$, and direct radio frequency receivers (RX-DRF blocks) $1025_1$ to $1025_K$, a common RF-ADC 1029 for all digital receiver chains $1021_1$ to $1021_K$. The receiver comprises a filter bank 1045 that defines the receiver frequency bands. For calibration a calibration stage is provided. In order to increase the dynamic range, it is noted that an analogue to digital converter could be used for each frequency band according to an alternative embodiment, and thus, in which case there is no need for received signals to be combined after the band filters, before connecting to each ADC.

It can therefore be seen that, in the embodiment of FIG. 9, each digital receiver chain is coupled to receive a digital representation of multiple radio frequency bands, including a particular radio frequency band for processing by the respective digital receiver chain, wherein each digital receiver chain comprises a digital receiver that is programmable to select a particular radio frequency band from the digital representation of the multiple radio frequency bands, and adapted to down convert the selected radio frequency band into a digital baseband signal associated with the particular radio frequency band.

The digital receiver sub module further comprises an RF analogue to digital converter coupled to receive an analogue signal comprising the multiple radio frequency bands, which is adapted to output the digital representation of the multiple radio frequency bands to each digital receiver chain.

A combining unit is coupled to receive multiple analogue radio frequency signals, and adapted to combine the multiple analogue radio frequency signals into the analogue signal comprising multiple radio frequency bands for processing by the RF analogue to digital converter.

A digital processing unit is coupled to receive the output of each digital receiver, and adapted to process the output of each digital receiver to provide a digital baseband output signal.

The digital processing unit can form part of a common digital processing unit that is common to all digital receiver chains in a particular digital receiver sub module.

The digital receiver sub module further comprises a calibration stage that is adapted during a calibration mode of operation to transmit a calibration signal to the input of the digital receiver sub module, and adapted to detect the phase, amplitude and/or delay of the calibration signal after being converted to a baseband signal in each digital receiver chain, the detected signal from each digital receiver chain providing a set of feedback signals for use by the calibration stage to define a set of correction parameters, wherein the set of correction parameters are used by the digital processing unit to adjust one or more of the phase, amplitude and/or delay of a base band signal in one or more of the digital receiver chains.

The calibration stage comprises: a calibration transmitter for coupling the calibration signal to an input of the digital receiver sub module; a calibration receiver for receiving the set of feedback signals from each digital receiver chain, wherein the calibration receiver is adapted to compare the phase, amplitude and/or delay of each of the set of feedback signals, and determine the set of correction parameters based on the comparison.

Among the advantages of the digital radio modules of the various embodiments described above, are that they enable a simplified board structure to be provided, that is the number of layers for the board can be significantly reduced. The embodiments of the invention also provide a frequency agnostic transmitter and a frequency agnostic receiver. They provide a multi band multi carrier transmitter and multi antenna, utilizing the same wideband multi band RF power amplifier for all carriers.

The embodiments of the invention provide a power efficient implementation due to common components being utilized.

The modular design enables the DRF to RF DAC high speed interfaces to be internalized in the same module.

Power consumption is reduced on the high speed interfaces because there is less capacitance because of the manner in which the components are integrated on the same module.

The embodiments of the invention have the advantage of providing extended control of transmitter and receiver behavior due to digital domain processing.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A digital radio module having a modular architecture for use in a multi-band multi-standard radio communication apparatus that is operable over a wide frequency range, the digital radio module comprising:
   one or more digital transmitter sub modules, each digital transmitter sub module comprising a plurality of digital transmitter chains;
   one or more digital receiver sub modules, each digital receiver sub module comprising a plurality of digital receiver chains;
   wherein each of the digital transmitter sub modules and digital receiver sub modules comprises a respective control unit for individually configuring each digital transmitter sub module and digital receiver sub module such that the digital radio module is configured to transmit and/or receive multiple different carrier frequency signals in one or more different modes of operation,
   wherein each transmitter chain comprises a digital transmitter that is configured convert a respective digital base band signal directly into a digital radio frequency signal; and
   wherein each digital transmitter sub module comprises:
      a digital combining unit coupled to receive the output of each digital transmitter chain, and configured to combine the digital radio frequency signal received from each digital transmitter chain into a digital radio frequency signal comprising multiple radio frequency bands; and
      a digital to analog converter coupled to receive the digital radio frequency signal comprising multiple radio frequency bands, and configured to convert the digital radio frequency signal into an analog radio frequency signal comprising multiple radio frequency bands,
   wherein each digital transmitter sub module further comprises a digital pre-distortion unit coupled between the digital combining unit and the digital to analog converter, and configured to modify the digital radio frequency signal comprising multiple radio frequency bands prior to conversion by the digital to analog converter.

2. A digital radio module as claimed in claim 1, wherein each digital transmitter sub module further comprises a common processing unit, the common processing unit coupled to receive a plurality of base band carrier signals, and configured to digitally process the plurality of base band carrier signals to produce the digital representation of each base band signal for each of the digital transmitter chains.

3. A digital radio module having a modular architecture for use in a multi-band multi-standard radio communication apparatus that is operable over a wide frequency range, the digital radio module comprising:
   one or more digital transmitter sub modules, each digital transmitter sub module comprising a plurality of digital transmitter chains;
   one or more digital receiver sub modules, each digital receiver sub module comprising a plurality of digital receiver chains;
   wherein each of the digital transmitter sub modules and digital receiver sub modules comprises a respective control unit for individually configuring each digital transmitter sub module and digital receiver sub module such that the digital radio module is configured to transmit and/or receive multiple different carrier frequency signals in one or more different modes of operation,
   wherein each digital transmitter sub module further comprises a common processing unit, the common processing unit coupled to receive a plurality of base band carrier signals, and configured adapted to digitally process the plurality of base band carrier signals to produce the digital representation of each base band signal for each of the digital transmitter chains,
   the digital radio module further comprising a common characterization and/or linearization unit for the plurality of digital transmitter sub modules, wherein the common characterization and/or linearization unit is configured to monitor the output of a power amplifier or antenna being fed by a digital transmitter sub module, and configured to provide feedback signals to the common processing unit.

4. A digital radio module as claimed in claim 3, wherein the common characterization and/or linearization unit comprises:
   a digital receiver coupled to the output of the power amplifier or antenna; and
   a transmitter observation receiver coupled to receive an output of the digital receiver, and provide the feedback signals to the common processing unit.

5. A digital radio module as claimed in claim 1, wherein each digital receiver chain is coupled to receive a digital representation of multiple radio frequency bands, including a particular radio frequency band for processing by the respective digital receiver chain, and wherein each digital receiver chain comprises a digital receiver that is programmable to select a particular radio frequency band from the digital representation of the multiple radio frequency bands, and configured to down convert the selected radio frequency band into a digital baseband signal associated with the particular radio frequency band.

6. A digital radio module as claimed in claim 5, wherein each digital receiver sub module further comprises an RF analog to digital converter coupled to receive an analog signal comprising the multiple radio frequency bands, and configured to output the digital representation of the multiple radio frequency bands to each digital receiver chain.

7. A digital radio module having a modular architecture for use in a multi-band multi-standard radio communication apparatus that is operable over a wide frequency range, the digital radio module comprising:
   one or more digital transmitter sub modules, each digital transmitter sub module comprising a plurality of digital transmitter chains;
   one or more digital receiver sub modules, each digital receiver sub module comprising a plurality of digital receiver chains;
   wherein each of the digital transmitter sub modules and digital receiver sub modules comprises a respective control unit for individual configuring each digital transmitter sub module and digital receiver sub module such that the digital radio module is configured to transmit and/or receive multiple different carrier frequency signals in one or more different modes of operation, wherein each digital receiver chain is coupled to receive a digital representation of multiple radio frequency bands, including a particular radio frequency band for processing by the respective digital receiver chain, and wherein each digital receiver chain comprises a digital receiver that is programmable to select a particular radio frequency band from the digital representation of the multiple radio frequency bands, and configured to down convert the selected radio frequency band into a digital baseband signal associated with the particular radio frequency band, wherein each digital receiver sub module further comprises a combining unit coupled to receive multiple analog radio frequency signals, and configured to combine the multiple analog radio frequency signals into the analog signal comprising multiple radio frequency bands for processing by the RF analog to digital converter.

8. A digital radio module as claimed in claim 5, wherein each digital receiver sub module comprises a digital processing unit coupled to receive the output of each digital receiver, and configured to process the output of each digital receiver to provide a digital baseband output signal.

9. A digital radio module as claimed in claim 8, wherein the digital processing unit forms part of a common digital processing unit that is common to all digital receiver chains in a particular digital receiver sub module.

10. A digital radio module as claimed in claim 8, wherein each digital receiver sub module further comprises a calibration stage that is configured during a calibration mode of operation to transmit a calibration signal to the input of the digital receiver sub module, and configured to detect the phase, amplitude and/or delay of the calibration signal after being converted to a baseband signal in each digital receiver chain, the detected signal from each digital receiver chain providing a set of feedback signals for use by the calibration stage to define a set of correction parameters, wherein the set of correction parameters are used by the digital processing unit to adjust one or more of the phase, amplitude and/or delay of a base band signal in one or more of the digital receiver chains.

11. A digital radio module as claimed in claim 10, wherein the calibration stage comprises:
a calibration transmitter for coupling the calibration signal to an input of the digital receiver sub module;
a calibration receiver for receiving the set of feedback signals from each digital receiver chain, wherein the calibration receiver is configured to compare the phase, amplitude and/or delay of each of the set of feedback signals, and determine the set of correction parameters based on the comparison.

12. A digital radio module as claimed in claim 1, further comprising a timing control unit that is common to all of the digital transmitter sub modules and digital receiver sub modules, for synchronizing timing between the plurality of sub modules.

\* \* \* \* \*